June 16, 1925.  1,542,464
I. M. McNEIL
WAVE MOTOR
Filed March 1, 1924   2 Sheets-Sheet 1
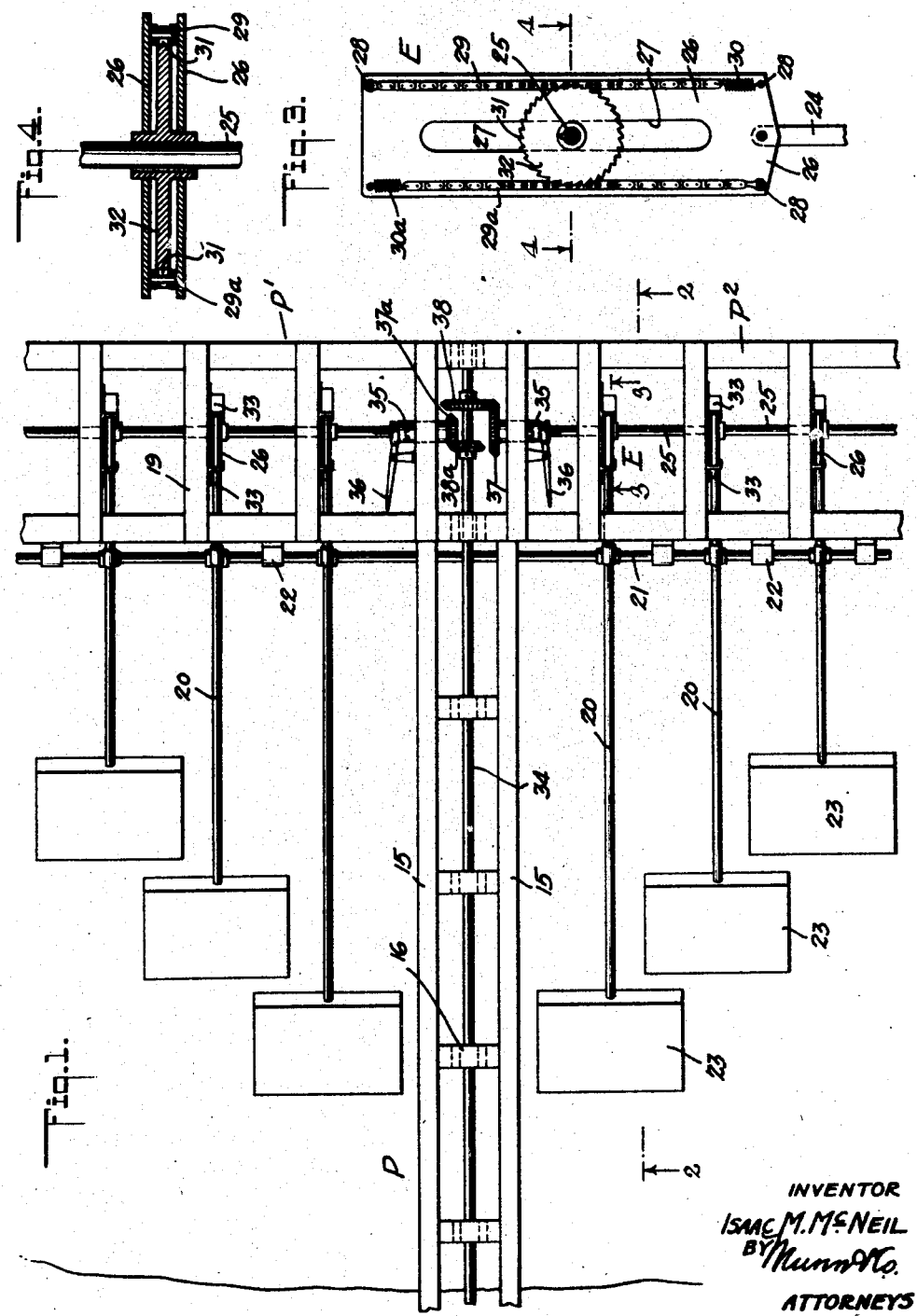
INVENTOR
Isaac M. McNeil
BY Munn & Co.
ATTORNEYS

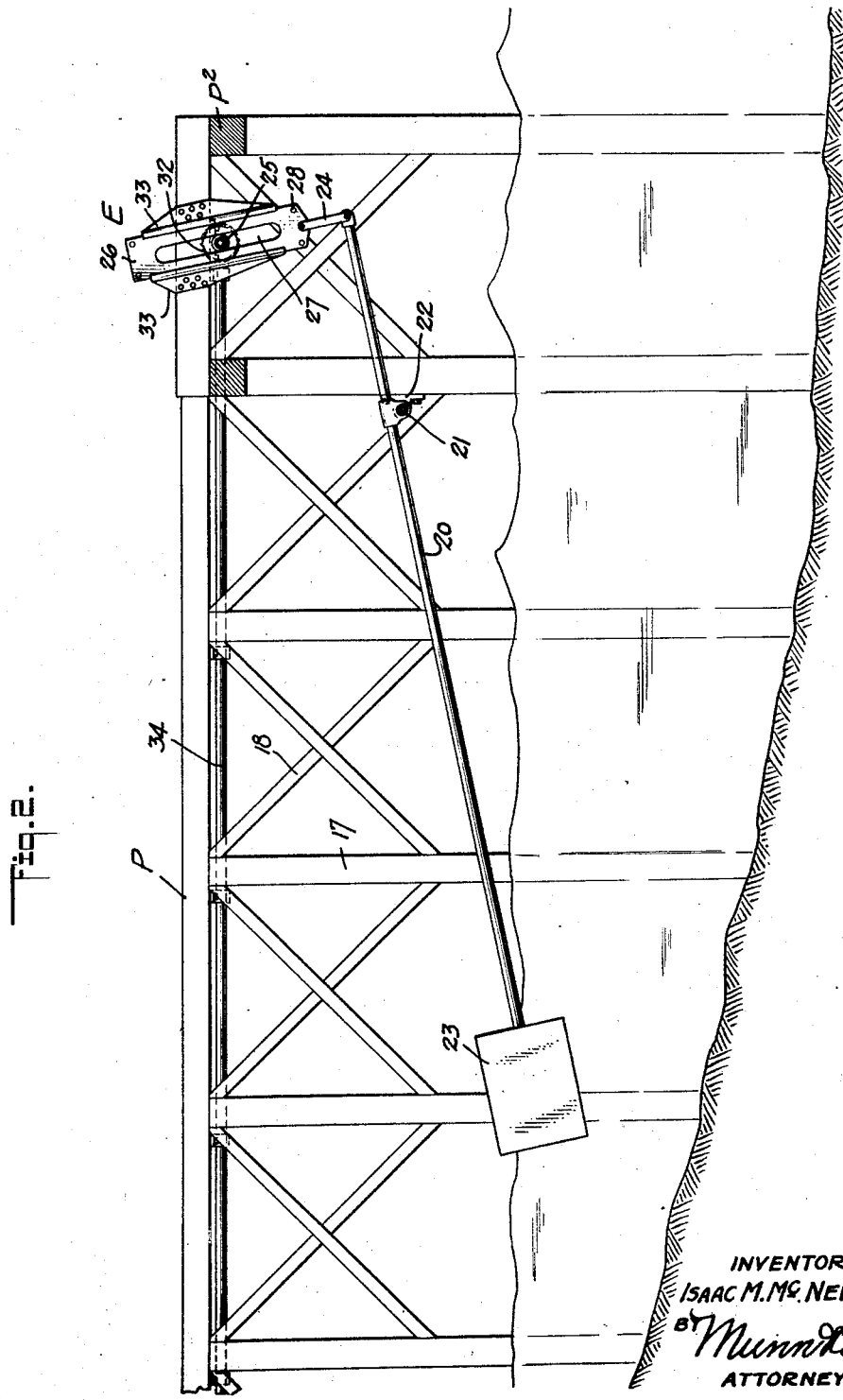

Patented June 16, 1925.

1,542,464

UNITED STATES PATENT OFFICE.

ISAAC M. McNEIL, OF VENICE, CALIFORNIA.

WAVE MOTOR.

Application filed March 1, 1924. Serial No. 696,359.

*To all whom it may concern:*

Be it known that I, ISAAC M. McNEIL, a citizen of the United States, and a resident of Venice, in the county of Los Angeles and State of California, have invented certain new and useful Improvements in Wave Motors, of which the following is a specification.

My invention relates to wave motors, and a purpose of my invention is the provision of a wave motor to provide simple, durable and efficient means for converting the power of the waves into useful work.

It is also a purpose of my invention to provide a wave motor including a plurality of float operated reciprocating elements which are associated with one or more shafts to effect rotation of the shafts in one direction.

I will describe only one form of wave motor embodying my invention, and will then point out the novel features thereof in claims.

In the drawings

Figure 1 is a view showing in top plan one form of wave motor embodying my invention;

Figure 2 is a vertical sectional view taken on the line 2—2 of Figure 1;

Figure 3 is a fragmentary sectional view taken on the line 3—3 of Figure 1;

Figure 4 is a horizontal sectional view taken on the line 4—4 of Figure 3.

Referring specifically to the drawings, in which similar reference characters refer to similar parts, my invention in its present embodiment comprises a pier designated generally at P, and including parallel rails or beams 15 connected at intervals by cross bars 16 and supported in elevated position above a body of water by means of piles 17 connected by intersecting brace rods 18. The pier, as clearly illustrated in Figure 2, extends from the shore outwardly above the water to any suitable point, and at its outer end it is provided with lateral extensions P' and P² which are constructed in a manner similar to the pier P and include transverse beams 19. Each pier extension P and P' is provided with a wave motor unit, and as the two units are identical in construction a description of one will suffice for both.

Each motor unit comprises a plurality of rocker arms 20 fulcrumed between their ends on an axle 21 supported in brackets 22, and as shown in Figure 1 this axle provides a support for the arms of both units. The arms 20 are graduated in length and are provided at their lower or inner ends with floats 23 adapted to repose on the water so as to be subjected to the action of the waves. The outer or upper ends of the arms 20 are operatively connected to the elements E through links 24, such elements being designed to transmit the rocking motion of the lever to a shaft 25 journaled in bearings secured to the cross bars 19. Each element E, as clearly illustrated in Figures 3 and 4, comprises a pair of plates 26 provided with slots 27 to accommodate the shaft 25 and to thereby allow reciprocating movement of the plates upon the shaft. Connecting pins or rivets 28 serve to secure the plates 26 in spaced relation to each other and to provide attaching means for chains 29 and 29ª and springs 30 and 30ª. These chains and springs are arranged in the manner shown in Figure 3, and are adapted to have engagement with the toothed periphery 31 of a ratchet wheel 32, the latter being keyed to the shaft 25 and arranged between the plates 26, as shown in Figure 4. The plates 26 are slidably supported in frames 33 rigidly secured to the cross beams 19 and arranged on an incline so that the plates will move in an inclined path under the action of the rocking arm 20. The links 24 are connected to the lower ends of the plates 26 to allow the unrestricted movement of the rocker arm 20 while at the same time transmitting the motion of the upper end of the arm to the plates.

By this construction and arrangement it will be seen that during upward movement of the elements E the chain 29 will engage the teeth 31 of the wheel 32 and thus rotate the latter in a counter-clockwise direction as when viewed in Figure 3, to impart a corresponding movement to the shaft 25. During this movement the teeth of the wheel 32 slip on the chain 29ª, and any tendency of the wheel to pull the chain longitudinally is compensated for by means of the spring 38. During downward movement of the plates 26 the chain 29ª engages the teeth 31 of the wheel 32 to effect rotation of the latter in the same direction, the wheel slipping over the surface of the chain 29, and the spring 30 compensating for any longitudinal movement of the chain. In this operation it will be seen that under the reciprocating movement of the plates 26 the chains and ratchet wheel operate to rotate the shaft 25 in one and the same direction at all times.

The rotary motion of the shaft 25 is transmitted to a shaft 34 journaled in bearings carried by the cross beams 16 of the pier P, and the shaft 34 is adapted to extend rearwardly along the pier to the shore, where the motion of said shaft may be connected to any suitable apparatus for converting the power of the waves into useful work. As shown in Figure 1, the shaft 25 is provided with a clutch 35 operated by a lever 36 to operatively connect a bevel gear 37 to a similar gear 38 keyed to the shaft 34. The shaft 25 of the other unit is provided with a similar clutch 35 for operatively connecting a gear 37$^a$ to a gear 38$^a$ keyed to the shaft 34.

In the operation of the wave motor, the waves operate to move the floats 23 vertically, thereby rocking the arms 20 about the axle 21 as a center to effect a reciprocating movement of the elements E. This reciprocating movement is converted into unidirectional rotary movement through the chains and ratchet wheels in the manner previously described, whereby rotation of the shafts 25 in the same direction is effected. Through the gears 37, 38, etc. the motion of the shafts 25 is transmitted to the shaft 24, and should it be desired that only one unit of the motor operate, the other unit can be disconnected from the shaft 34 through a clutch 35.

By reference to Figure 1 it will be seen that because of the graduated lengths of the arms 20 it is possible to arrange the floats 23 in overlapped relation, which permits the compact nesting of the floats, and which disposes the floats at different points so as to be successively moved by a single wave in effecting the separate operation of the floats and arms and in utilizing to a maximum extent the power of a wave. Should any of the floats 23 remain stationary the corresponding ratchet wheel 31 will still be free to rotate without actuating the plates 26, because by virtue of the expansible or resilient supporting means for the chains the teeth of the ratchet wheel will slip over the surfaces of the chains and thus prevent movement of the chains and floats.

Although I have herein shown and described but one form of wave motor embodying my invention, it is to be understood that various changes and modifications may be made herein without departing from the spirit of the invention and the spirit and scope of the appended claims.

What is claimed is:

1. In combination, an arm, a shaft, spaced plates mounted for restricted movement on the shaft, a link connection between the one end of the arm and the plates, a ratchet wheel fixed to the shaft between the plates, and chains between and secured to the plates for engagement with the ratchet wheel at diametrically opposed points, said chains having one of their ends connected to the plates by means of springs, for the purpose described.

2. In combination, a pivoted arm, a shaft, a ratchet wheel fixed to the shaft, a member mounted for reciprocating movement on the shaft and operatively connected to the arm, and yieldingly supported chains mounted on the members to alternately engage the ratchet wheel when the member is reciprocated to effect unidirectional rotation of the wheel.

3. In combination, a pivoted arm, a shaft, stationary guides, spaced plates slidably mounted in the guides and operatively connected to the arm, said plates being slotted to receive the shaft, a ratchet wheel fixed to the shaft between the plates, and yieldingly supported chains mounted on and between the plates to alternately engage the ratchet wheel when the plates are reciprocated to effect unidirectional rotation of the shaft.

ISAAC M. McNEIL.